(12) United States Patent
Tsukiyoshi et al.

(10) Patent No.: US 10,418,615 B2
(45) Date of Patent: Sep. 17, 2019

(54) BATTERY TERMINAL

(71) Applicant: Sumitomo Wiring Systems, Ltd., Yokkaichi, Mie (JP)

(72) Inventors: Keiichi Tsukiyoshi, Mie (JP); Toshikazu Sakurai, Mie (JP)

(73) Assignee: Sumitomo Wiring Systems, Ltd. (JP)

( * ) Notice: Subject to any disclaimer, the term of this patent is extended or adjusted under 35 U.S.C. 154(b) by 249 days.

(21) Appl. No.: 15/397,775

(22) Filed: Jan. 4, 2017

(65) Prior Publication Data
US 2017/0214029 A1   Jul. 27, 2017

(30) Foreign Application Priority Data

Jan. 27, 2016 (JP) ................................ 2016-012986

(51) Int. Cl.
*H01M 2/30* (2006.01)

(52) U.S. Cl.
CPC .................................... *H01M 2/30* (2013.01)

(58) Field of Classification Search
CPC .............................. H01R 11/281; H01M 2/307
USPC ......................................... 439/765, 764, 762
See application file for complete search history.

(56) References Cited

U.S. PATENT DOCUMENTS

| 4,747,793 A * | 5/1988 | Fukuda | H01R 11/287 |
| | | | 439/754 |
| 5,021,013 A * | 6/1991 | Wiesler | H01R 11/289 |
| | | | 439/754 |
| 5,492,780 A * | 2/1996 | Okada | H01R 11/283 |
| | | | 429/121 |
| 5,836,574 A * | 11/1998 | Park | B25B 5/104 |
| | | | 269/93 |
| 10,056,599 B2 * | 8/2018 | Kato | H01R 11/283 |
| 2016/0126530 A1 * | 5/2016 | Kato | H01M 2/305 |
| | | | 429/121 |
| 2016/0254518 A1 * | 9/2016 | Kato | H01R 11/283 |
| | | | 429/122 |
| 2017/0125781 A1 * | 5/2017 | Tsukiyoshi | H01M 2/30 |
| 2017/0214029 A1 * | 7/2017 | Tsukiyoshi | H01M 2/30 |
| 2017/0229686 A1 * | 8/2017 | Takasu | H01M 10/658 |

FOREIGN PATENT DOCUMENTS

| EP | 2192656 A1 | 6/2010 |
| JP | 2010-33783 | 2/2010 |

OTHER PUBLICATIONS

German Office Action dated May 2, 2018.

* cited by examiner

*Primary Examiner* — Abdullah A Riyami
*Assistant Examiner* — Nader J Alhawamdeh
(74) *Attorney, Agent, or Firm* — Gerald E. Hespos; Michael J. Porco; Matthew T. Hespos

(57) ABSTRACT

A battery terminal includes a fastening portion (11) that is partially open in a circumferential direction and a flange (42) projects radially out from the fastening portion (11). Two facing portions (14) project radially out from open ends (13) of the fastening portion (11) and face each other in the circumferential direction. The fastening portion (11) is reduced in diameter and fastened to a battery post P by having the facing portions (14) approach each other. The flange (42) of the fastening portion (11) has cuts (20) for partially reducing a thickness of the fastening portion (11) in a radial direction.

13 Claims, 14 Drawing Sheets

BATTERY TERMINAL

BACKGROUND

1. Field of the Invention

The invention relates to a battery terminal.

2. Description of the Related Art

Japanese Unexamined Patent Publication No. 2010-33783 discloses a battery terminal to be connected to a battery for an automotive vehicle or the like. The battery terminal includes a fastening portion to be fastened to a battery post that stands on the battery. The fastening portion has a tubular shape that is partially open in a circumferential direction and is deformed and reduced in diameter and fastened to the battery post by having two facing portions on open end parts approach each other. The facing portions caused to approach each other by fastening a bolt and a nut.

The fastening portion of the battery terminal described above has a relatively high rigidity, and is not easily reduced in diameter to conform entirely to the outer shape of the battery post. Thus, a clearance may be formed between the fastening portion and the battery post and a holding force may not be sufficient. Further, a clearance between the open end parts of the fastening portion and the battery post enable the open end parts to be deformed and folded into the clearance by a strong fastening force. If the open end parts of the fastening portion are deformed, the fastening portion cannot be fastened sufficiently and a holding force may be reduced when the battery terminal is fastened again to the battery post for maintenance or the like.

The invention was completed based on the above situation and aims to improve close contact of a battery terminal with a battery post.

SUMMARY

The invention relates to a battery terminal with a fastening portion that is partially open in a circumferential direction and includes a flange projecting substantially radially out. Two facing portions project substantially radially out from open ends of the fastening portion and substantially face each other in the circumferential direction. The fastening portion can be reduced in diameter and fastened to a battery post by causing the facing portions to approach each other. The flange of the fastening portion has at least one cut for partially reducing a thickness of the fastening portion in a radial direction.

The battery terminal may further include at least one wire connecting portion to be connected to a wire, and at least one coupling that couples the wire connecting portion and the fastening portion.

The cut may be formed on a base end of the fastening that is connected to the coupling. The base end of the fastening portion has a relatively high rigidity, but the cut enables the base end to be deformed more easily into close contact with the battery post.

The cut may be provided on an intermediate part between a base end of the fastening portion and the open ends. Thus, the intermediate part of the fastening portion is deformed more easily into close contact with the battery post.

The cut may be formed by recessing an outer circumferential surface of the fastening portion. Thus, the inner circumferential surface of the fastening portion can be a smooth surface without any unevenness.

The battery terminal may further include at least one wire connecting portion to be connected to a wire, and at least one coupling for coupling the wire connecting portion and the fastening portion. Cuts may be formed on a base end of the fastening portion connected to the coupling and an intermediate part between the base end and the open ends. A thickness of the fastening portion in the cut formed on the base end may be smaller than a thickness of the fastening portion in the cut formed on the intermediate part. Thus, the entire fastening portion can be deformed easily in a well-balanced manner by making the thickness in the cut on the more rigid base end be smaller than the thickness in the cut formed on the intermediate part.

The open ends and the base end may be arranged at substantially opposite positions across a center axis of the fastening portion, and/or the cuts may be formed substantially symmetrically with respect to a direction orthogonal to a facing direction of the open ends and the base end. According to this configuration, the entire fastening portion can be deformed easily in a well-balanced manner.

The facing portions may be reinforced by having a plate material folded on opposite sides in a facing direction at least partly overlapped on upper sides thereof.

According to the above, the cut makes the fastening portion easily deform in conformity with the outer shape of the battery post, and close contact with the battery post can be improved.

These and other features and advantages of the invention will become more apparent upon reading the following detailed description and accompanying drawings. It should be understood that even though embodiments are described separately, single features may be combined to additional embodiments.

DETAILED DESCRIPTION

Figure 1:
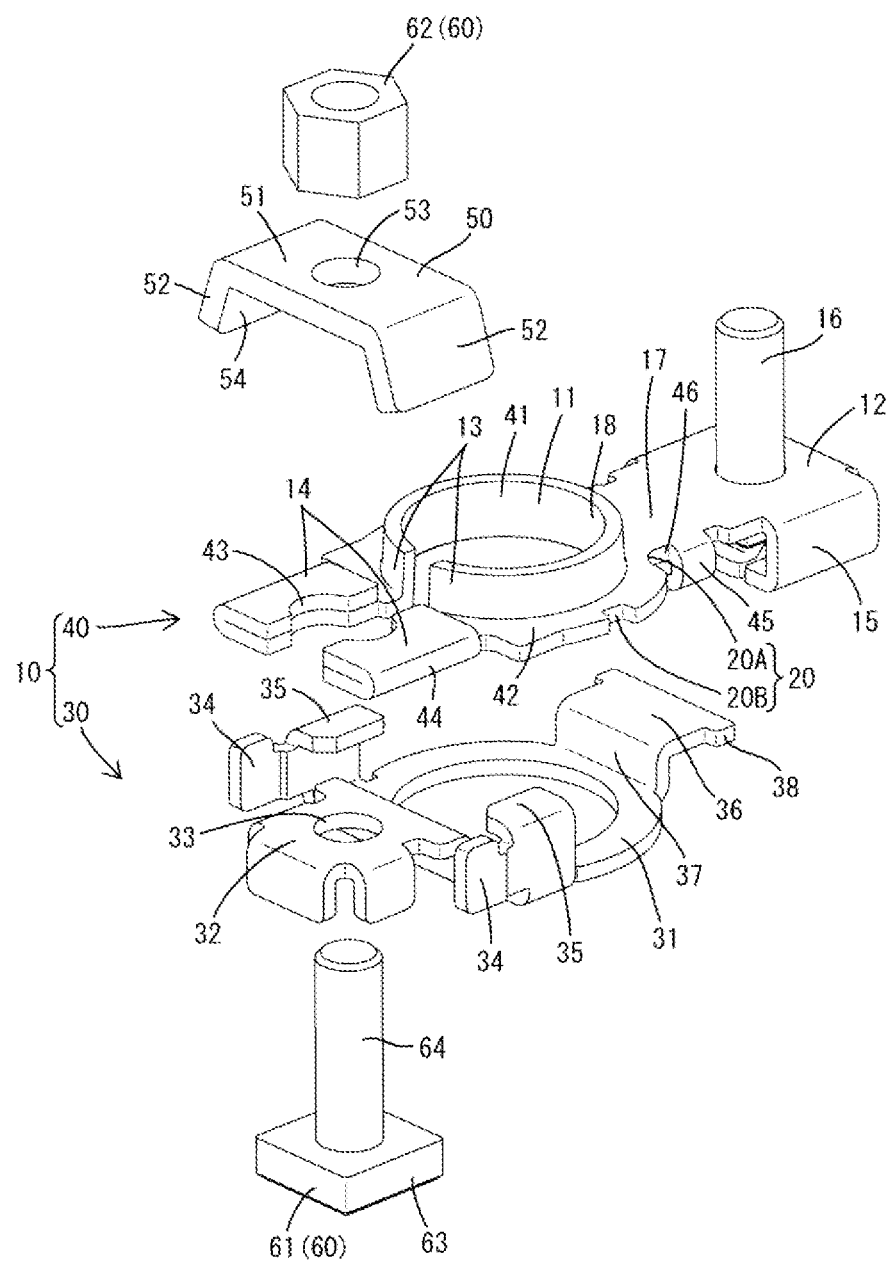
FIG. 1 is an exploded perspective view of a battery terminal in a first embodiment.
Figure 2:
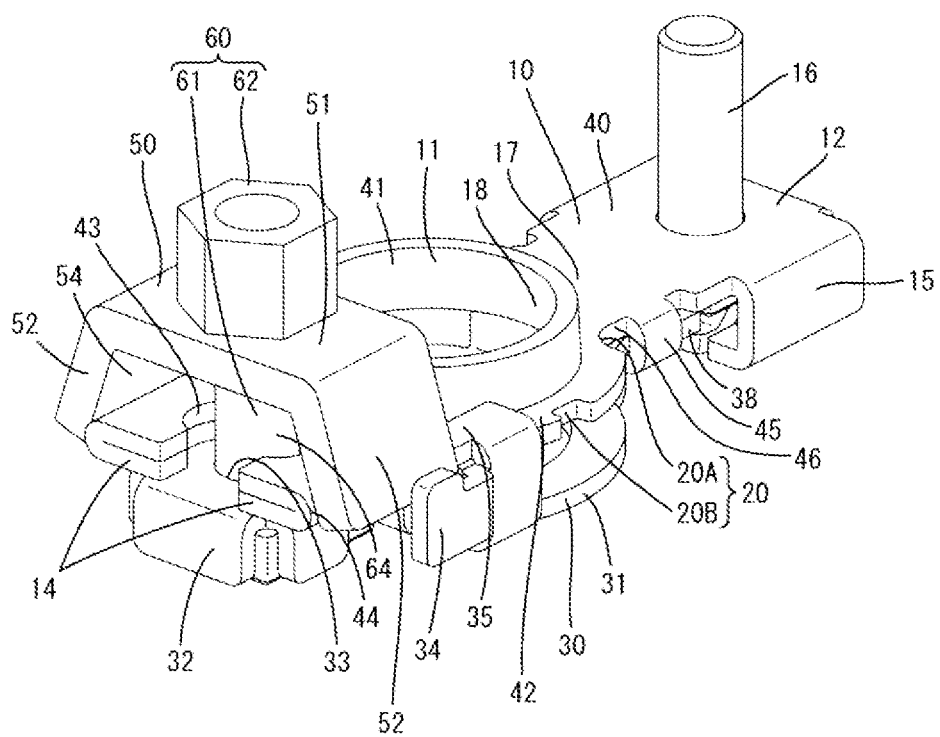
FIG. 2 is a perspective view showing the battery terminal.
Figure 3:
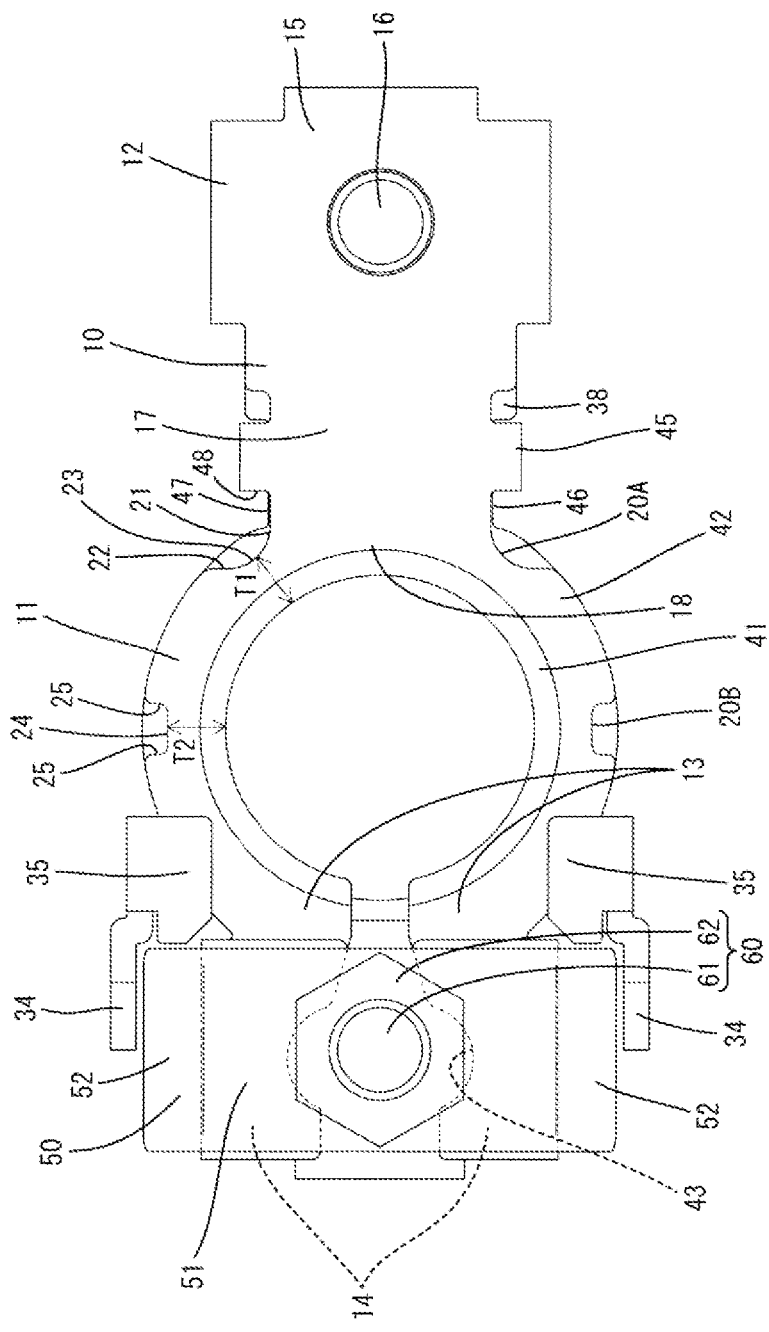
FIG. 3 is a plan view showing the battery terminal.

A first embodiment of the invention is described in detail with reference to FIGS. 1 to 8. A battery terminal in this embodiment is to be connected to a battery post P standing on a battery for an automotive vehicle or the like. The battery post P has a truncated substantially conical or frustum shape projecting from the upper surface of a battery body. In the following description, upper and lower sides of FIG. 1 are referred to as upper and lower sides, upper and lower sides of FIG. 3 are referred to as right and left sides, and left and right sides of FIG. 3 are referred to as front and rear sides in each constituent member.

The battery terminal includes a terminal body 10, a cam plate 50 formed separately from the terminal body 10, and a fastening tool with a bolt 61 and a nut 62. The bolt 61 includes a substantially rectangular, polygonal or non-circular portion 63 and a male screw 64. The nut 62 is polygonal and threadedly engages the male screw 64.

The terminal body 10 is integral or unitary with a fastening portion 11 to be fastened to the battery post P and a wire connecting portion 12 to be connected to an unillustrated wire. The fastening portion 11 has a substantially circular shape partially open in a circumferential direction and surrounds the battery post P over substantially the entire circumference to sandwich the battery post P from opposite left and right sides. Two facing portions 14 project radially out from open ends 13 of the fastening portion 11 and face each other in the circumferential direction. The fastening portion 11 is reduced in diameter and fastened to the battery post P by the facing portions 14 approaching each other. The fastening portion 11 has cuts 20 that are described in detail later.

Figure 8:
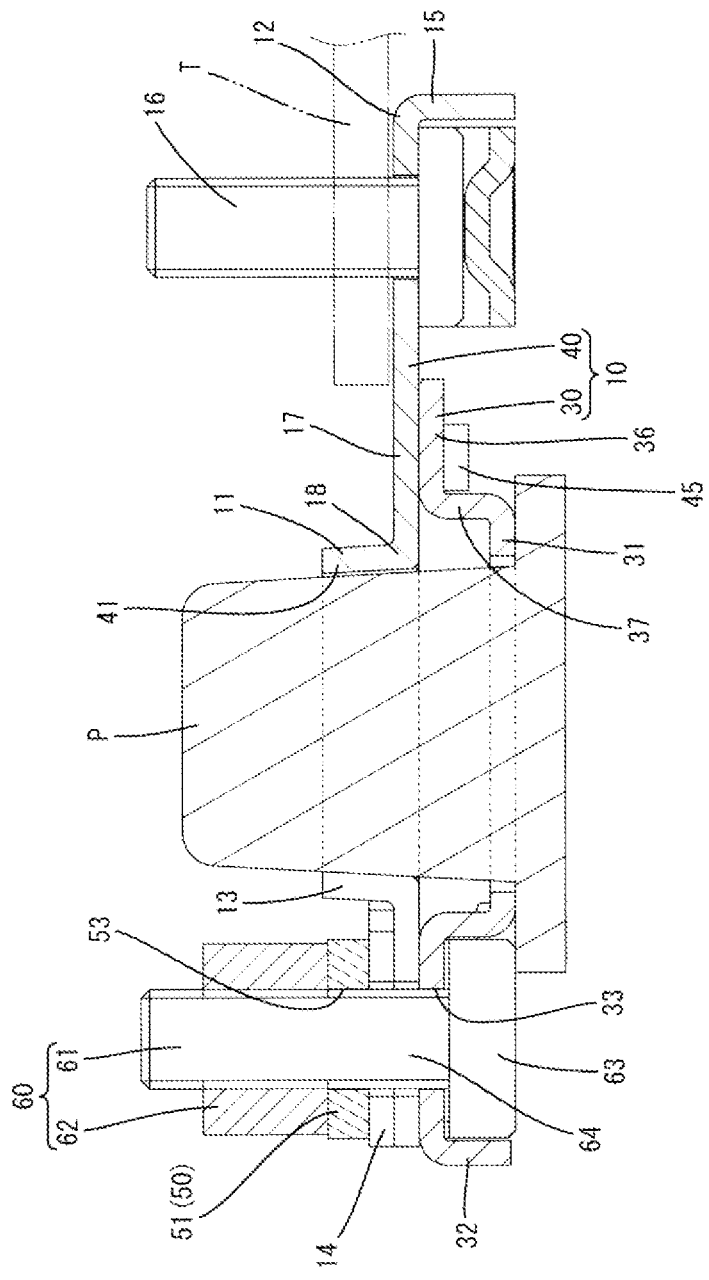
FIG. 8 is a section showing the battery terminal connected to the battery post.

The wire connecting portion 12 of the terminal body 10 has a box 15 and a stud bolt 16 projects from a box 15. A terminal fitting T connected to an end part of the wire is connected to the box 15, as shown in FIG. 8. More particularly, the terminal fitting T is overlapped on the upper surface of the box 15 with the stud bolt 16 inserted through an unillustrated through hole, and is pressed against and fixed to the box 15 by fastening an unillustrated fixing nut above the terminal fitting T.

The terminal body 10 includes a coupling 17 that couples the fastening portion 11 and the wire connecting portion 12. The open end parts 13 of the fastening portion 11 and a base end part 18 of the fastening portion 11 connected to the coupling 17 are arranged at substantially opposite positions across a center axis of the fastening portion 11. In other words, the two facing portions 14, the fastening portion 11, the coupling 17 and the wire connecting portion 12 are arranged substantially linearly side by side.

The terminal body 10 is formed by vertically overlapping and assembling a lower member 30 and an upper member 40.

The lower member 30 is formed into a predetermined shape by applying, folding, embossing and/or bending and the like to a plate material of metal (e.g. iron) punched out into a predetermined shape.

The lower member 30 includes an annular portion 31 that is circular in plan view. The annular portion 31 has a dimension substantially equal to or slightly larger than a maximum outer diameter at the lower end of the battery post P.

A fitting 32 is provided in front of the annular portion 31 and the head 63 of the bolt 61 can be fit therein. The fitting 32 has a non-circular shape (such as a substantially rectangular or polygonal box shape) to be able to stop the rotation of the head 63 of the bolt 61. A through hole 33 is formed on the upper surface of the fitting 32 and the male screw 64 of the bolt 61 is vertically insertable therethrough. The head 63 of the bolt 61 is fit into the fitting 32 from below and the male screw 64 projects upward of the fitting 32.

The lower member 30 includes inclination suppressing portions 34 for suppressing the inclination of the cam plate 50 by being located at both left and right sides of the cam plate 50 to be described later. The inclination suppressing portions 34 are provided at both left and right sides of the fitting portion 32.

The lower member 30 includes separation suppressing portions 35 for suppressing vertical separation of the upper member 40 and the lower member 30 by locking an upper side of a flange 42 of the upper member 40 to be described later. The separation suppressing portions 35 are provided behind the inclination suppressing portions 34.

The lower member 30 includes a uniting portion 36 to be vertically overlapped on and united with the upper member 40. The uniting portion 36 is provided on a rear end part of the annular portion 31 and is slightly above the annular portion 31. The front end of the uniting portion 36 is connected to a stand-up portion 37 standing up substantially perpendicularly from the rear end edge of the annular portion 31. Protrusions 38 project laterally on the rear end of the uniting portion 36.

The upper member 40 is formed into a predetermined shape by applying folding, embossing and/or bending and the like to a plate material of metal (e.g. copper) punched or cut out into a specified shape.

The upper member 40 is provided with the fastening portion 11. The fastening portion 11 includes a tubular portion 41 standing up substantially perpendicularly along the outer circumferential surface of the battery post P and the flange 42 projecting substantially horizontally out from the lower end of the tubular portion 41. The tubular portion 41 is formed by burring and stands up from the inner circumferential edge of the flange 42. The inner circumferential surface of the tubular portion 41 is a smooth surface without any unevenness. The tubular portion 41 is arranged above and at a distance from the annular portion 31 substantially in a coaxial positional relationship. Further, a front end part of the flange 42 is in contact with the lower surfaces of the separation suppressing portions 35 or arranged to face those lower surfaces with a tiny clearance therebetween. The fastening portion 11 is deformed in a plate surface direction of the flange 42.

The upper member 40 has the two facing portions 14 that extend horizontally forward from the flange 42. Each facing portion 14 is reinforced by having a plate material folded on opposite sides in a facing direction overlapped on upper sides thereof. The facing portions 14 are placed on the upper surface of the fitting portion 32 of the lower member 30.

Escaping recesses 43 are formed on facing surfaces of the facing portions 14 to prevent contact with the male screw 64 of the bolt 61. Further, outer side surfaces (surfaces opposite the facing surfaces) of the facing portions 14 define contact surfaces 44 that contact the cam plate 50 to be described later. The contact surfaces 44 are folded parts of the plate material and are curved smoothly.

The upper member 40 has the wire connecting portion 12 and the coupling 17 that couples the wire connecting portion 12 and the fastening portion 11. The coupling 17 is a horizontal plate that couples the upper surface of the box 15 of the wire connecting portion 12 to the flange 42 of the fastening portion 11.

The coupling 17 is provided with crimping pieces 45 for integrally uniting the upper member 40 and the lower member 30. The crimping pieces 45 extend down from both left and right side edges of the coupling 17. The crimping pieces 45 are provided in an intermediate part of the coupling 17 in a front-back direction.

The coupling 17 is overlapped on the upper surface of the uniting portion 36 of the lower member 30 and the crimping pieces 45 are crimped to be held in close contact with the lower surface of the uniting portion 36. In this way, relative displacements of the lower member 30 and the upper member 40 in the vertical and lateral directions are restricted. Further, the crimping pieces 45 are located between the stand-up portion 37 and the protrusions 38 of the lower member 30. In this way, relative displacements of the lower member 30 and the upper member 40 in the front-back direction are restricted.

Cut recesses 46 are formed on left and right sides of a front end part of the coupling 17 (sides in front of the crimping pieces 45), as shown in FIG. 3. The cut recesses 46 are rectangular and recessed toward a center from both left and right ends of the coupling 17. The cut recess 46 includes a longitudinal edge part 47 parallel to the front-back direction and a lateral edge part 48 parallel to the lateral direction.

Figure 4:
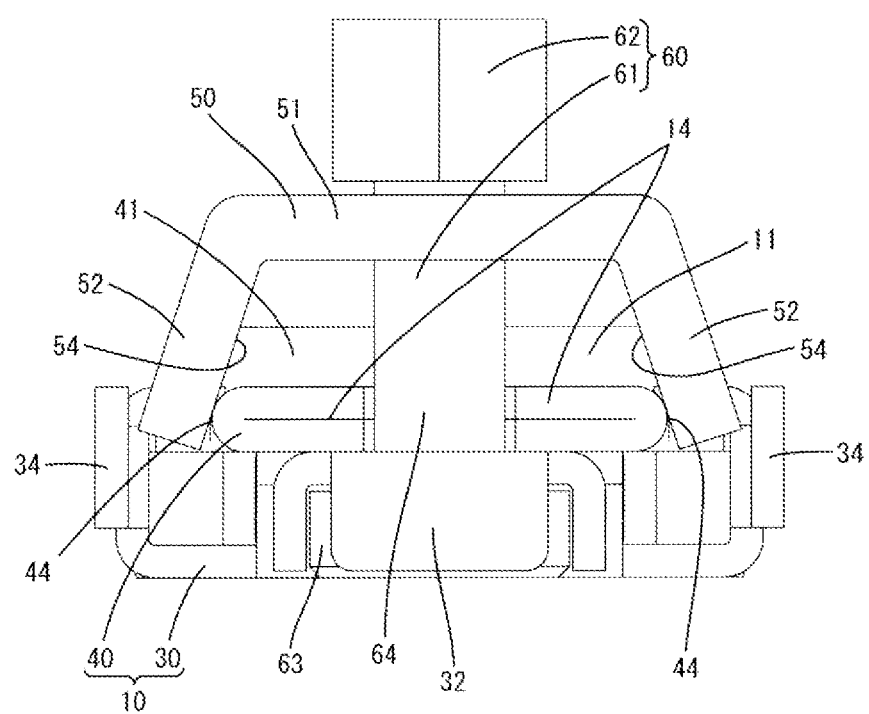
FIG. 4 is a front view showing the battery terminal.
Figure 5:
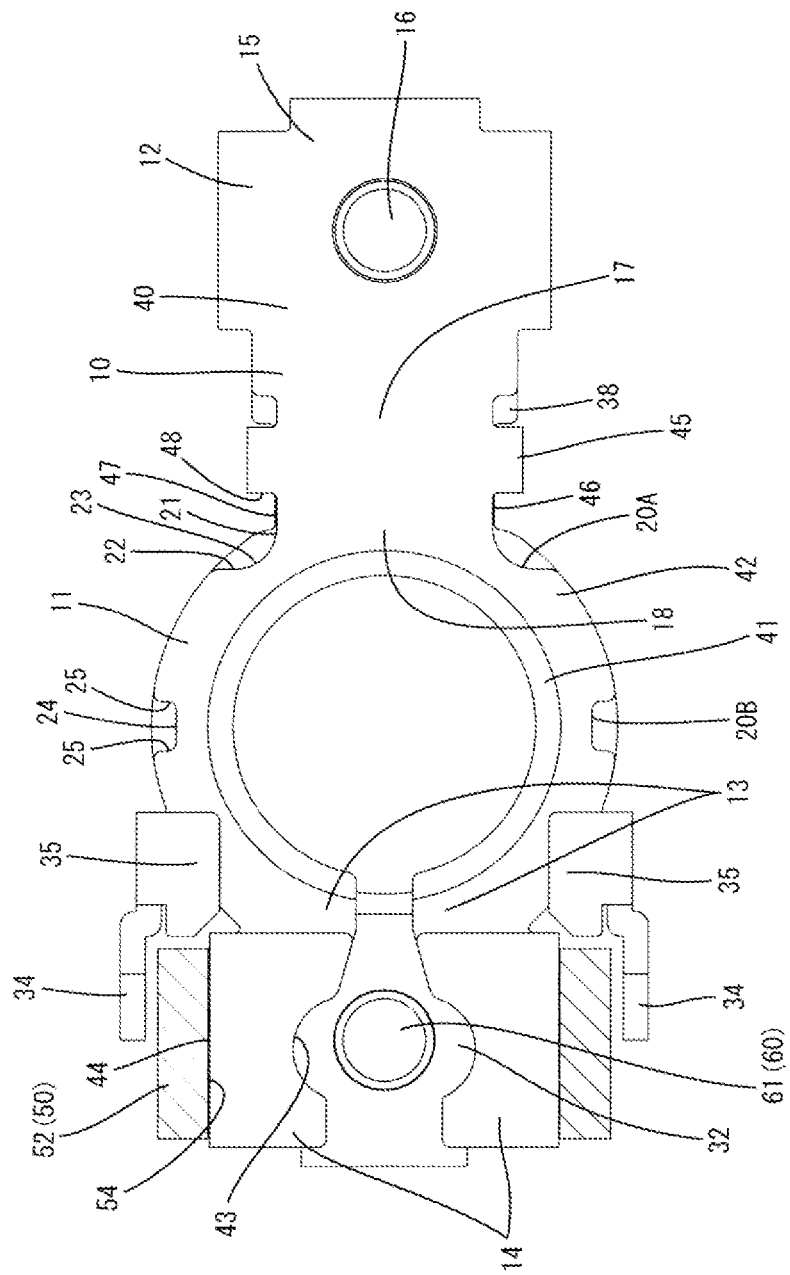
FIG. 5 is a plan view of the battery terminal showing a state where a fastening portion is not deformed.

The cam plate 50 is formed into a predetermined shape by applying bending and like to a metal plate material having a larger thickness than the lower member 30 and the upper member 40. As shown in FIG. 4, the cam plate 50 is bilaterally symmetrical and includes a horizontal portion 51 extending substantially horizontally over the facing portions 14 and two inclined portions 52 inclined obliquely out from left and right end edges of the horizontal portion 51.

The horizontal portion 51 is formed with an insertion hole 53 through which the male screw 64 of the bolt 61 is vertically insertable. The left and right inclined portions 52 are inclined to be more spaced apart in the lateral direction with distance from the horizontal portion 51. Lower ends of the inclined portions 52 of the cam plate 50 are in contact with the contact surfaces 44 of the facing portions 14, as shown in FIG. 4, in a state before the fastening tool 60 is fastened. The male screw 64 is inserted through the through hole 53 of the cam plate 50 and the nut 62 is engaged threadedly with the male screw 64 above the cam plate 50. The cam plate 50 is fastened by the fastening tool 60, thereby being displaced down. The inner surfaces of the left and right inclined portions 52 define pressing surfaces 54 capable of pressing the contact surface 44 of the facing portions 14 inward (directions in which the facing portions 14 approach each other) as the cam plate 50 is displaced.

As shown in FIG. 3, the fastening portion 11 is provided with cuts 20 for partially reducing a thickness of the fastening portion 11 in a radial direction. The cuts 20 are formed by recessing an outer circumferential surface side of the fastening portion 11. The cuts 20 are formed on the flange 42 of the fastening portion 11 and partially cut off an outer edge of the flange 42.

The cuts 20 are provided on the base end 18 of the fastening portion 11 and intermediate parts between the base end 18 and the open end parts 13.

The cuts 20 on the base end 18 (hereinafter, referred to as base end cuts 20A) are provided on both left and right sides of the base end 18. The left and right base end cuts 20A are symmetrical with respect to a center of the fastening portion 11 in the lateral direction.

The base end cut 20A includes a base end longitudinal edge 21 extending in the front-back direction, a base end lateral edge 22 extending in the lateral direction and a base end curved edge 23 curved and connected between the base end longitudinal edge 21 and the base end lateral edge 22. The base end longitudinal edge 21 is parallel to the front-back direction and the base end lateral edge 22 is parallel to the lateral direction.

The base end cut 20A is connected to and in front of the cut recess 46 of the coupling 17. The base end longitudinal edge 21 of the base end cut 20A and the longitudinal edge part 47 of the cut recess 46 are connected straight.

The cuts 20 provided on the intermediate part (hereinafter, intermediate cuts 20B) is provided in a middle between the open end part 13 and the base end part 18. The intermediate cuts 20B are provided on both left and right sides of the fastening portion 11 and are symmetrical with respect to the center of the fastening portion 11 in the lateral direction.

The intermediate cut 20B has a non-circular (e.g. rectangular or polygonal) shape slightly longer in the front-back direction. The intermediate cut 20B includes an intermediate longitudinal edge 24 extending in the front-back direction and front and rear intermediate lateral edge parts 25 extending in the lateral direction. The intermediate longitudinal edge 24 is parallel to the front-back direction and the intermediate lateral edges 25 are parallel to the lateral direction.

A thickness T1 of the fastening portion 11 in the base end cut 20A is equal to a thickness T2 of the fastening portion 11 in the intermediate cut 20B. The thickness T1 of the fastening portion 11 in the base end cut 20A is a radial dimension of the fastening portion 11 from the base end curved edge part 23 to the inner circumferential surface of the fastening portion 11 (inner circumferential surface of the tubular portion 41), and the thickness T2 of the fastening portion 11 in the intermediate cut 20B is a radial dimension of the fastening portion 11 from the intermediate longitudinal edge 24 to the inner circumferential surface of the fastening portion 11. The thickness T1 of the fastening portion 11 in the base end cut 20A and the thickness T2 of the fastening portion 11 in the intermediate cut 20B are both slightly larger than half the thickness of parts of the fastening portion 11 where no cut 20 is provided.

All of the cuts 20 are formed symmetrically with respect to the lateral direction (direction orthogonal to a facing direction of the open ends 13 and the base end 18). Note that, the entire terminal body 10 including not only the cuts 20, but also the facing portions 14, the coupling 17 and the wire connecting portion 12 is bilaterally symmetrical.

Next, an example of an operation of connecting the battery terminal in this embodiment to the battery post P is described.

First, the fastening portion 11 of the battery terminal is fit to the battery post P. The fastening portion 11 is fit externally around the battery post P with a slight clearance defined therebetween.

Subsequently, the fastening tool 60 is fastened. When the nut 62 is rotated about an axis of the bolt 61 using a tool, the nut 62 is displaced relatively down with respect to the male screw 64 and toward the head 63. The cam plate 50 pressed by the nut 62 is lowered gradually and the pressure surfaces 54 of the cam plate 50 press the contact surfaces 44 of the facing portions 14 inward. By this pressing action, the facing portions 14 gradually approach each other and the fastening portion 11 is deformed and reduced in diameter as an interval between the facing portions 14 is narrowed.

Figure 6:
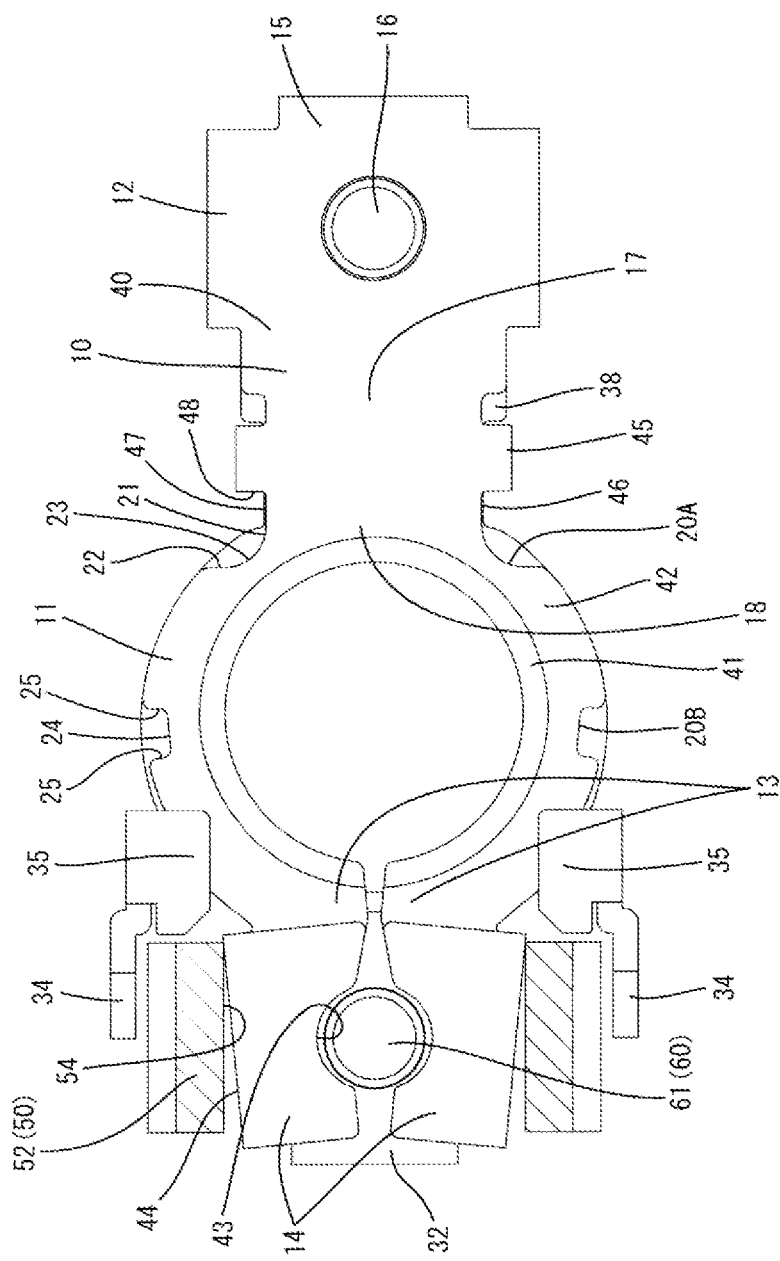
FIG. 6 is a plan view of the battery terminal showing a state where the fastening portion is deformed.
Figure 7:
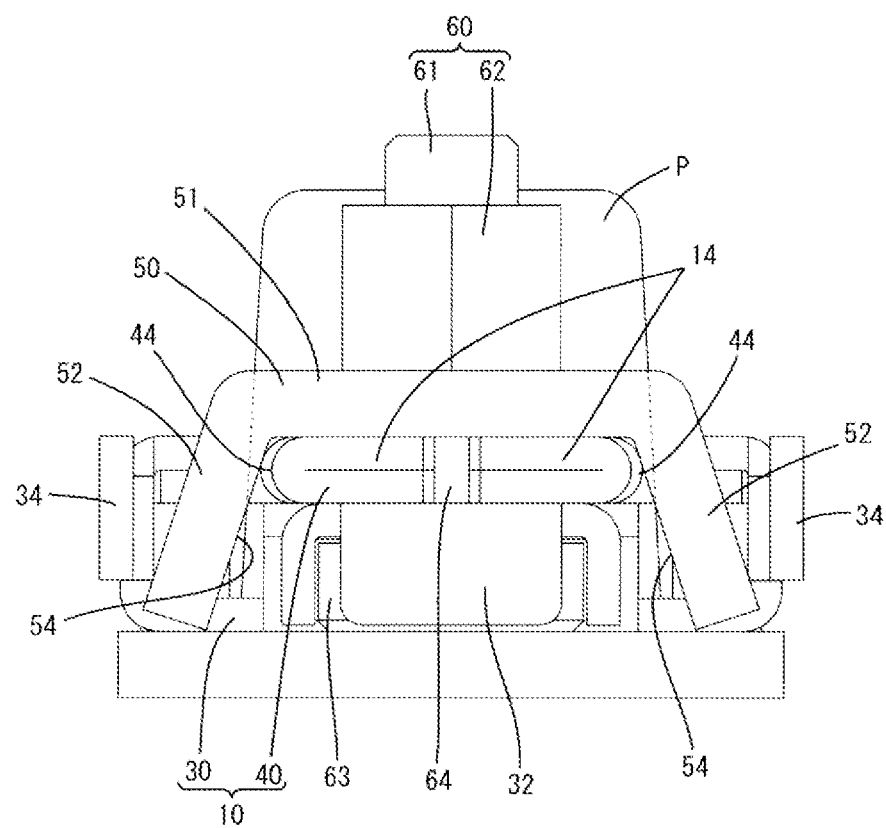
FIG. 7 is a front view showing the battery terminal connected to a battery post.

In an initial stage of deforming and reducing the fastening portion 11 in diameter, the base end part 18 of the fastening portion 11 comes into contact with the battery post P and a clearance is formed around it. As the interval between the facing portions 14 is narrowed, a lateral dimension of the fastening portion 11 is reduced. At this time, the fastening portion 11 is deformed to bend inward in parts where the base end cuts 20A and the intermediate cuts 20B are formed. Thus, as shown in FIG. 6, the fastening portion 11 is deformed and reduced in diameter to narrow the lateral dimension of the fastening portion 11 and to displace the open end parts 13 toward the base end part 18. Thus, the entire inner circumferential surface of the tubular portion 41 is held in close contact with the battery post P without leaving any clearance. The fastening portion 11 is fastened sufficiently and fixed, and the battery terminal is connected conductively to the battery post P. At this time, as shown in FIG. 7, the horizontal portion 51 of the cam plate 50 is in contact with the upper surfaces of the facing portions 14. In the above way, the operation of connecting the battery terminal to the battery post P is completed.

Next, functions and effects of the embodiment configured as described above are described.

The battery terminal of this embodiment includes the fastening portion 11 formed to be partially open in the circumferential direction and the two facing portions 14 projecting radially out from the open end parts 13 of the fastening portion 11 and face each other in the circumferential direction. The fastening portion 11 is reduced in diameter and fastened to the battery post P as the facing portions 14 approach each other, and the cuts 20 are provided to partially reduce the thickness of the fastening portion 11. According to this configuration, since the cuts 20 make the fastening portion 11 easily deformed in conformity with the outer shape of the battery post P, the formation of a clearance between the fastening portion 11 and the battery post P can be suppressed. Thus, a holding force can be enhanced by entirely bringing the fastening portion 11 into surface contact with the battery post P. Further, since the deformation of the open ends 13 of the fastening portion 11 can be prevented, the fastening portion 11 can be sufficiently fastened in fastening the battery terminal to the battery post P again for maintenance or the like, with the result that a reduction of the holding force can be prevented.

Further, the battery terminal further includes the wire connecting portion 12 to be connected to the wire and the coupling 17 for coupling the wire connecting portion 12 and the fastening portion 11, and the cuts 20 are formed on the base end 18 of the fastening portion 11 connected to the coupling 17. According to this configuration, since the base end 18 having a relatively high rigidity in the fastening portion 11 is deformed easily, the formation of a clearance between the fastening portion 11 and the battery post P can be suppressed.

Further, the cuts 20 are provided on the intermediate parts between the base end 18 and the open end parts 13. According to this configuration, since the intermediate parts of the fastening portion 11 are deformed easily, the formation of a clearance between the fastening portion 11 and the battery post P can be suppressed.

Further, the cuts 20 are formed by recessing the outer circumferential surface of the fastening portion 11. According to this configuration, the inner circumferential surface of the fastening portion 11 can be a flat surface without any unevenness.

Further, the open end parts 13 and the base end 18 are arranged at the substantially opposite positions across the center axis of the fastening portion 11, and the cuts 20 are symmetrical with respect to the direction orthogonal to the facing direction of the open end parts 13 and the base end 18. According to this configuration, the entire fastening portion 11 can be deformed easily in a well-balanced manner.

Figure 9:
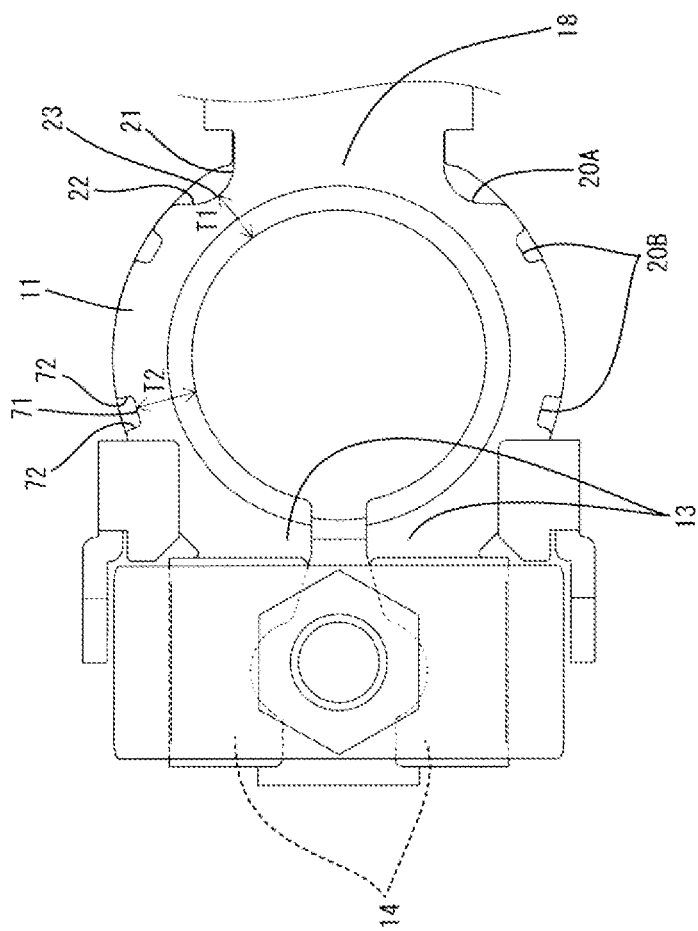
FIG. 9 is a plan view of a battery terminal with a second arrangement of cuts.

A battery terminal according to a second embodiment of the invention is described with reference to FIG. 9.

The battery terminal of this embodiment differs from the first embodiment in that a thickness T1 of a fastening portion 11 in a base end cut 20A is smaller than a thickness T2 of the fastening portion 11 in an intermediate cut 20B. Note that components substantially same as or similar to those of the first embodiment are denoted by the same reference signs and not repeatedly described.

The battery terminal in this embodiment includes the fastening portion 11 formed to be partially open in a circumferential direction and two facing portions 14 projecting radially out from open ends 13 of the fastening portion 11 and arranged to face each other in the circumferential direction, the fastening portion 11 is reduced in diameter and fastened to a battery post P by the fastening portions 14 approaching each other, and cuts 20 for partially reducing a thickness of the fastening portion 11 are provided. The cuts 20 include the base end cuts 20A formed on a base end 18 of the fastening portion 11 connected to a coupling 17, and the intermediate cuts 20B formed on intermediate parts between the base end 18 and the open ends 13.

As in the first embodiment, the base end cuts 20A are provided on both left and right sides of the base 18, each base end cut 20A includes a base end longitudinal edge 21 extending in a front-back direction, a base end lateral edge 22 extending in a lateral direction and a base end curved edge 23 curved and connected between the base end longitudinal edge 21 and the base end lateral edge 22, and connected to and in front of cut recesses 46 of the coupling 17.

Two of the intermediate cuts 20B are provided on each of the left and right sides of the fastening portion 11. The intermediate cuts 20B are provided at positions near the open ends 13 and at positions near the base end 18 between the open ends 13 and the base end 18. Each intermediate cut 20B has a rectangular shape slightly longer in the circumferential direction of the fastening portion 11 and includes an intermediate long edge 71 extending in the circumferential direction of the fastening portion 11 and two intermediate short edges 72 extending in a radial direction. Further, a cut depth (dimension in the radial direction) of the intermediate cut 20B is smaller than that of the base end cut 20A, and a cut width (dimension in the circumferential direction) of the intermediate cut 20B is smaller than that of the base end cut 20A. All of the cuts 20 are symmetrical with respect to the lateral direction (direction orthogonal to a facing direction of the open ends 13 and the base end 18) as in the first embodiment.

The thickness T1 of the fastening portion 11 in the base end cut 20A is smaller than the thickness T2 of the fastening portion 11 in the intermediate cut 20B. As in the first embodiment, the thickness T1 of the fastening portion 11 in the base end cut 20A is a radial dimension of the fastening portion 11 from the base end curved edge 23 to the inner circumferential surface of the fastening portion 11 (inner circumferential surface of a tubular portion 41), and the thickness T2 of the fastening portion 11 in the intermediate cut 20B is a radial dimension of the fastening portion 11 from the intermediate long edge 71 to the inner circumferential surface of the fastening portion 11.

As described above, in this embodiment, the cuts 20 make the fastening portion 11 easily deformed in conformity with the outer shape of the battery post P as in the first embodiment. Thus, the formation of a clearance between the fastening portion 11 and the battery post P can be suppressed. Further, the radial thickness T1 of the fastening portion 11 in the base end cut 20A is smaller than the radial thickness T2 of the fastening portion 11 in the intermediate cut 20B. Thus, the entire fastening portion 11 can be deformed easily in a well-balanced manner by making the thickness in the base end cut 20A on the more rigid base end 18 smaller than the thickness in the intermediate cut 20B.

The invention is not limited to the preceding embodiments. For example, the following embodiments also are included in the scope of the invention.

Although the battery terminal in which the fastening tool 60 is vertically fastened (fastened in a direction intersecting with the facing direction of the pair of facing portions 14) is illustrated in the above embodiments, there is no limitation to this. The invention can also be applied to battery terminals in which a fastening tool is laterally fastened (fastened in the facing direction of the pair of facing portions 14) or fastened along any other direction.

Although the terminal body 10 is formed by assembling the lower member 30 and the upper member 40 in the above embodiments, there is no limitation to this. The present invention can also be applied to terminal body portions integrally or unitarily formed such as by bending a single metal plate material.

Although the facing portions 14, the fastening portion 11, the coupling 17 and the wire connecting portion 12 are arranged linearly side by side in the above embodiments, there is no limitation to this. The present invention can also be applied to such an arrangement in which two facing portions are located on sides at 9020 from a coupling and a wire connecting portion with a fastening portion located therebetween.

Figure 10:
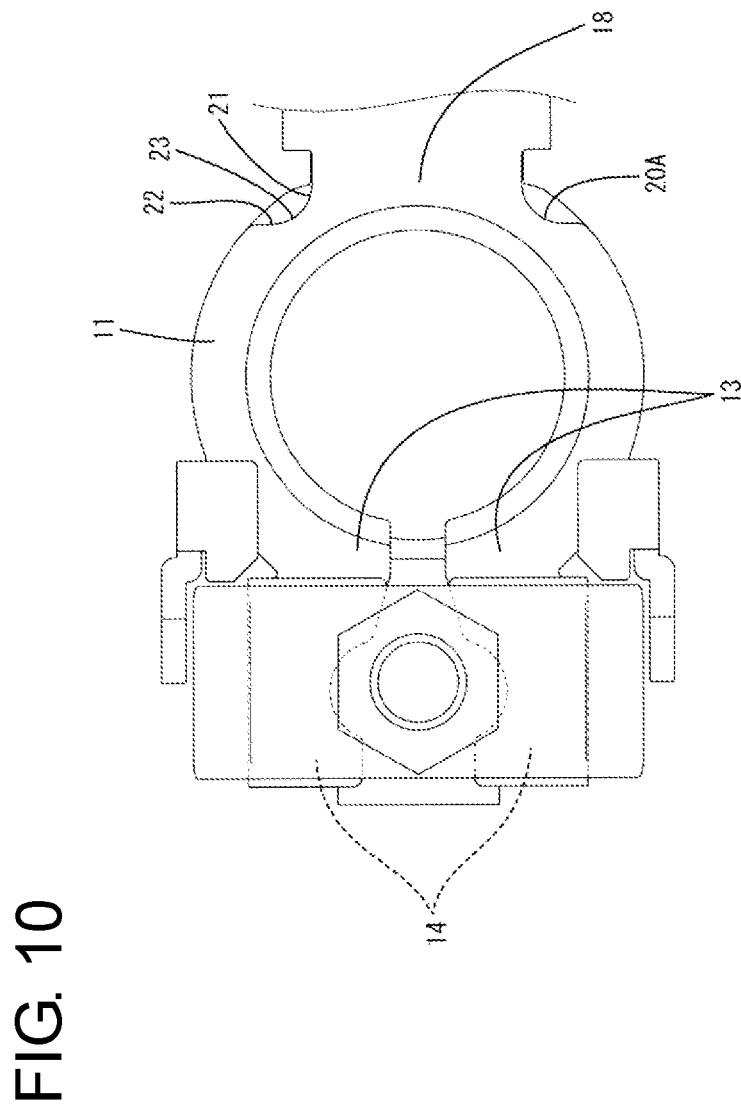
FIG. 10 is a plan view of a battery terminal with a third arrangement of cuts.

Although the cuts 20 include the base end cuts 20A and the intermediate cuts 20B in the above embodiments, there is no limitation to this. For example, as shown in FIG. 10, the cuts may include only the base end cuts 20A.

Figure 11:
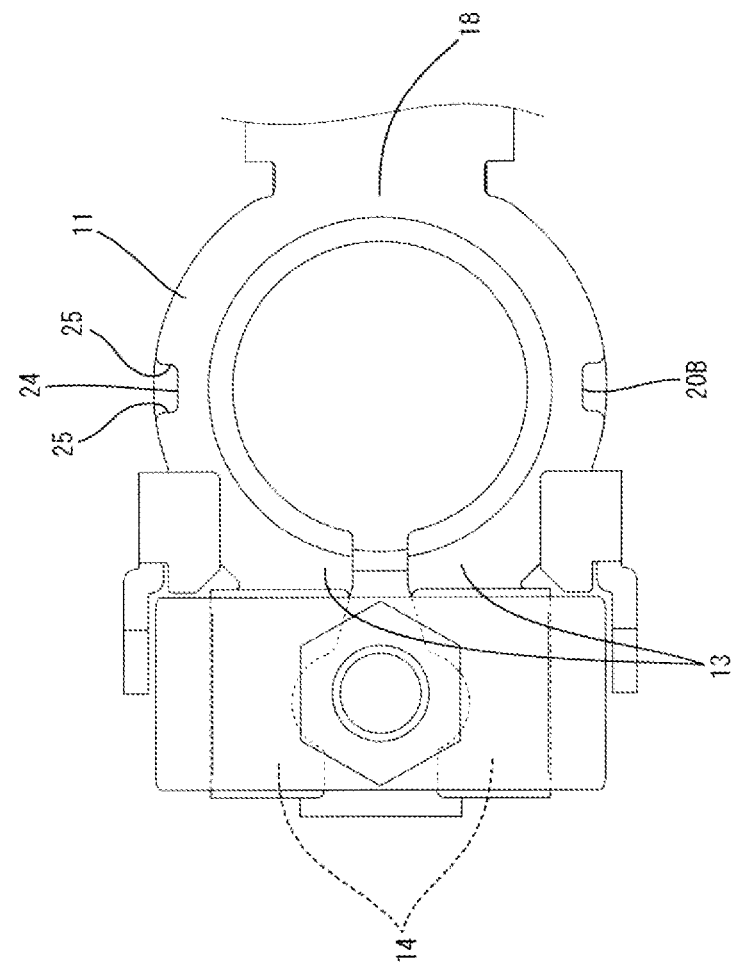
FIG. 11 is a plan view of a battery terminal with a fourth arrangement of cuts.

Although the cuts 20 include the base end cuts 20A and the intermediate cuts 20B in the above embodiments, there is no limitation to this. For example, as shown in FIG. 11, the cuts may include only the intermediate cuts 20B.

Figure 12:
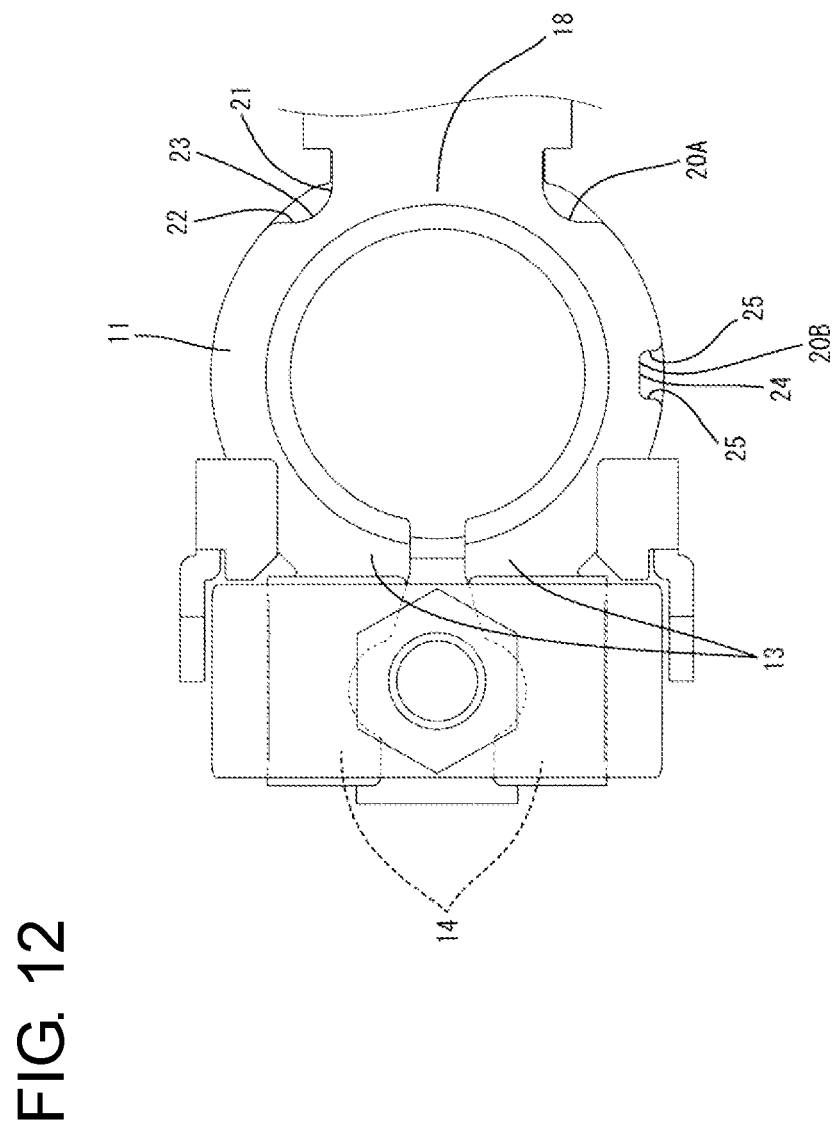
FIG. 12 is a plan view of a battery terminal with a fifth arrangement of cuts.

Although the intermediate cuts 20B are provided on both left and right sides of the fastening portion 11 in the above embodiments, there is no limitation to this. For example, as shown in FIG. 12, the intermediate cut 20B may be provided only on one side.

Figure 13:
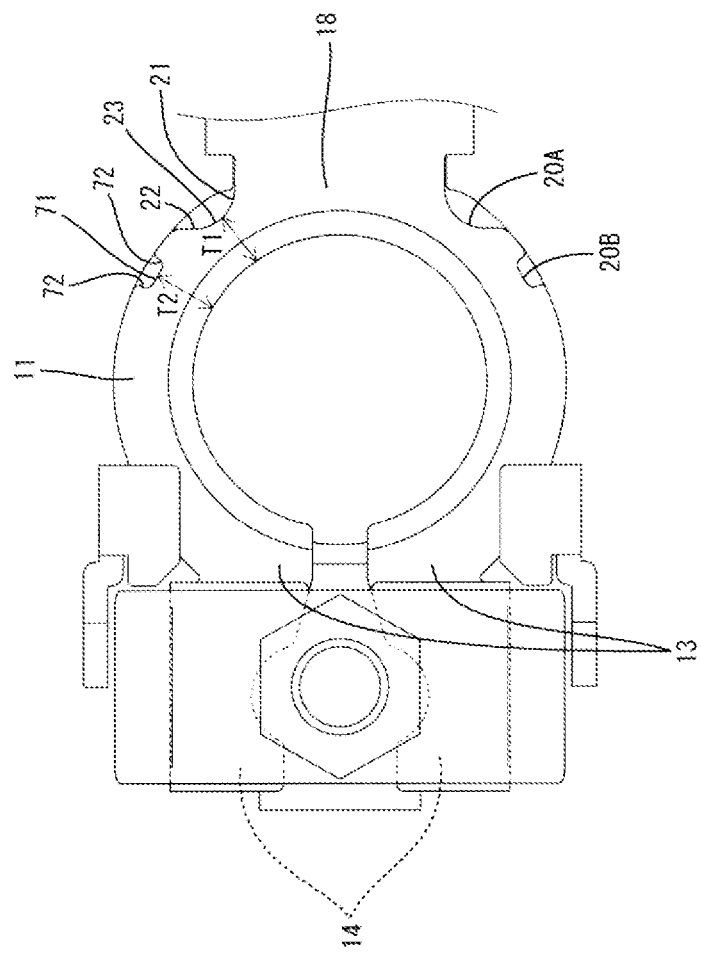
FIG. 13 is a plan view of a battery terminal with a sixth arrangement of cuts.

Although the intermediate cuts 20B are provided at the positions near the open ends 13 and at the positions near the base end 18 in the second embodiment, there is no limitation to this. For example, as shown in FIG. 13, the intermediate cuts 20B may be provided only at positions near the base end 18.

Figure 14:
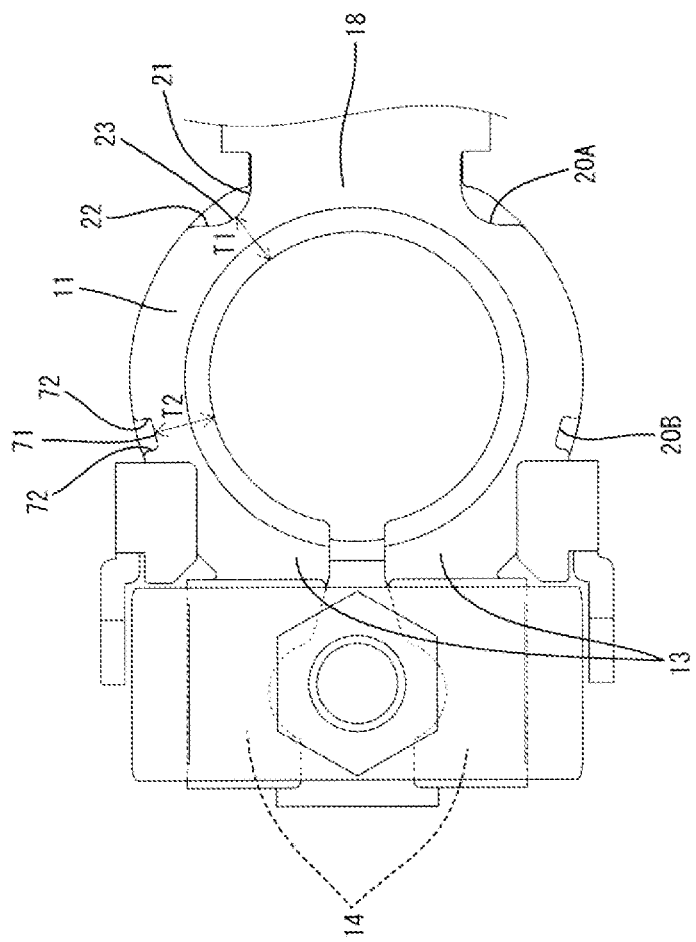
FIG. 14 is a plan view of a battery terminal with a seventh arrangement of cuts.

Although the intermediate cuts 20B are provided at the positions near the open ends 13 and at the positions near the base end 18 in the second embodiment, there is no limitation to this. For example, as shown in FIG. 14, the intermediate cuts 20B may be provided only at positions near the open ends 13.

REFERENCE SIGNS

P . . . battery post
T1 . . . thickness of fastening portion in cut on base end part
T2 . . . thickness of fastening portion in cut on intermediate part
11 . . . fastening portion
12 . . . wire connecting portion
13 . . . open end
14 . . . facing portion
17 . . . coupling
18 . . . base end
20 . . . cut
20A . . . base end cut
20B . . . intermediate cut
42 . . . flange

What is claimed is:

1. A battery terminal, comprising:
   a fastening portion formed to be partially open in a circumferential direction and including a flange projecting radially out and having an outer circumferential surface; and
   two facing portions projecting substantially radially out from open ends of the fastening portion and arranged to substantially face each other in the circumferential direction;
   wherein:
   the fastening portion can be reduced in diameter and fastened to a battery post by the facing portions approaching each other; and
   the flange of the fastening portion is provided with at least two cuts extending radially in from the outer circumferential surface of the flange of the fastening portion so that radial dimensions of the flange at the cuts are less than radial dimensions of the flange at locations circumferentially adjacent to the cuts.

2. The battery terminal of claim 1, further comprising:
   at least one wire connecting portion to be connected to a wire; and
   at least one coupling for coupling the wire connecting portion and the fastening portion.

3. The battery terminal of claim 2, wherein the cuts are formed on base end parts of the fastening portion connected to the coupling.

4. The battery terminal claim 1, wherein the cuts are provided on intermediate parts between a base end of the fastening portion and the open ends.

5. The battery terminal of claim 1, further comprising:
   at least one wire connecting portion to be connected to a wire; and
   at least one coupling for coupling the wire connecting portion and the fastening portion;
   wherein the at least two cuts comprises two base end cuts formed on a base end of the fastening portion connected to the coupling and two intermediate cuts between the base end and the open ends.

6. The battery terminal of claim 5, wherein radial dimensions of the flange at the base end cuts are smaller than radial dimensions of the flange at the intermediate cuts.

7. The battery terminal of claim 5, wherein:
   the open ends and the base end are arranged at substantially opposite positions across a center axis of the fastening portion; and/or
   the cuts are symmetrical with respect to a direction orthogonal to a facing direction of the open ends and the base end.

8. The battery terminal of claim 1, wherein the two facing portions are reinforced by having a plate material folded on opposite sides in a facing direction at least partly overlapped on upper sides thereof.

9. The battery terminal of claim 1, wherein the fastening portion has a circumferentially extending inner surface that is smooth with no unevenness.

10. A battery terminal, comprising:
    a fastening portion formed to be partially open in a circumferential direction so that the fastening portion can be reduced in diameter and fastened to a battery post by bringing the facing portions toward each other, the fastening portion including a flange projecting radially out and having an outer circumferential surface;

two facing portions projecting substantially radially out from open ends of the fastening portion and arranged to substantially face each other in the circumferential direction;

at least one wire connecting portion disposed at a position opposite the two facing portions and configured to be connected to a wire; and a coupling extending coupling the wire connecting portion and the fastening portion, wherein:

the flange of the fastening portion is provided with at least two intermediate cuts extending radially in from the outer circumferential surface of the flange of the fastening portion at positions spaced from both the coupling and the facing portions so that radial dimensions of the flange at the intermediate cuts are less than radial dimensions of the flange at locations circumferentially adjacent to the intermediate cuts.

11. The battery terminal of claim 10 wherein the intermediate cuts are at substantially diametrically opposite positions on the fastening portion.

12. The battery terminal of claim 10, wherein the flange further has two base end cuts substantially adjacent the coupling and extending radially in from the outer circumferential surface of the flange so that radial dimensions of the flange at the base end cuts are less than radial dimensions of the flange at locations circumferentially adjacent to the base end cuts.

13. The battery terminal of claim 12, wherein radial dimensions of the flange at the base end cuts are smaller than radial dimensions of the flange at the intermediate cuts.

* * * * *